May 25, 1965  J. R. CONGALTON  3,184,906
LAWN EDGE TRIMMER
Filed April 17, 1963

INVENTOR.
JACK R. CONGALTON
BY Thomas A. Mayner
ATTORNEY

3,184,906
LAWN EDGE TRIMMER
Jack R. Congalton, 1389 Homeland Drive, Rocky River 14, Ohio
Filed Apr. 17, 1963, Ser. No. 273,608
2 Claims. (Cl. 56—256)

This invention relates to an attachment for power lawn mowers and more particularly to an attachment thereto for use as an edger of lawns along driveways, walkways, curbs, etc.

Generally, edging of lawns where previously manually performed is now done by a powered apparatus specifically engineered for such use. Where a substantial area must be kept trim, such an apparatus is probably a good investment. Small city lawns hardly warrant such an expensive apparatus so resort is had to manual edging or to some improvised means such as an attachment to a powered lawn mower. Since power mowers are now commonly employed for lawn trimming or cutting, its power can be advantageously utilized for edging purposes and a number of edging attachments have been devised. The attachments, however, appear to have a drawback in that they generally comprise an assembly consisting of a number of interrelated parts including sheaves or pulleys and belting for power take-off from the main drive to the distant edger element. The attachments are totally separate arrangements so that an operator must have substantial mechanical acquaintance to add it onto a power mower then to disassemble it. The present improvement to edging attachments greatly simplifies it as a unit and its addition to mowers. It provides a single compact item, easily and readily attached to a mower through the use of the basic tools.

Advantageously, the edging attachment of this invention comprises a disk with a continuous or serrated periphery having an adjustable clamping means for grasping the circumferential surface of a drive or power wheel. The disk is, of course, of a larger diameter than the wheel so that it can operate outside and below the wheel to which it is clamped or fastened. The wheels of the power mower stay on the lawn while the disk cuts grass straying over the dug, edged lawn portion. The unusual and apparent advantages will be described in the following specification and drawing, where:

Figure 1:
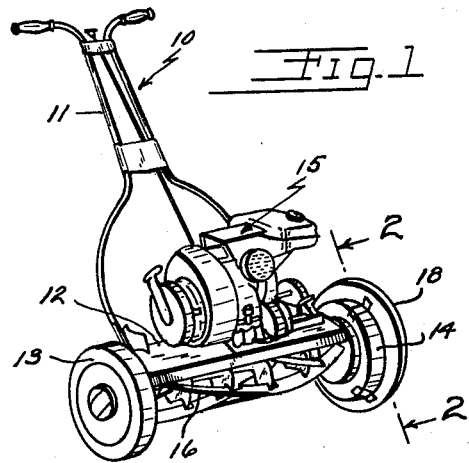
FIGURE 1 represents a lawn power mower with the disk edger attached to its left power wheel.

Referring to FIGURE 1 of the drawing, a power mower 10, for example, of the reel type is shown equipped with a disk lawn edge trimmer 18 attached by means of associated clamps to its left wheel 14. The mower is manually directed by means of the handle 11 as it is powered by a motor 15 that is positioned on a supporting bed 12 under which a reel 16 is positioned for rotation and to which are attached wheels 13 and 14. A mower of the type shown can be directed alongside an edged lawn, the wheels 13, 14 remaining in a level position on the turf while the edger or trimmer 18 dips down into the edged portion cutting off grass extending thereinto as the power mower moves along.

The circular blade or disk grass trimmer 18 is preferably of a thickness sufficient to resist bending or distortion should an obstacle as a stone or some other substance be encountered. It is square edged although it can also be honed to a taper to provide an improved peripheral cutting edge. Also, it has been found that a continuous periphery or finely serrated edge is advantageous over other forms in that a smooth and even operation results where otherwise there may occur jolting and uneven cutting. Advantageously, the disk is secured to a mower power wheel since it is positively rotated at all times so long as the motor is clutched-in for driving.

Figure 2:
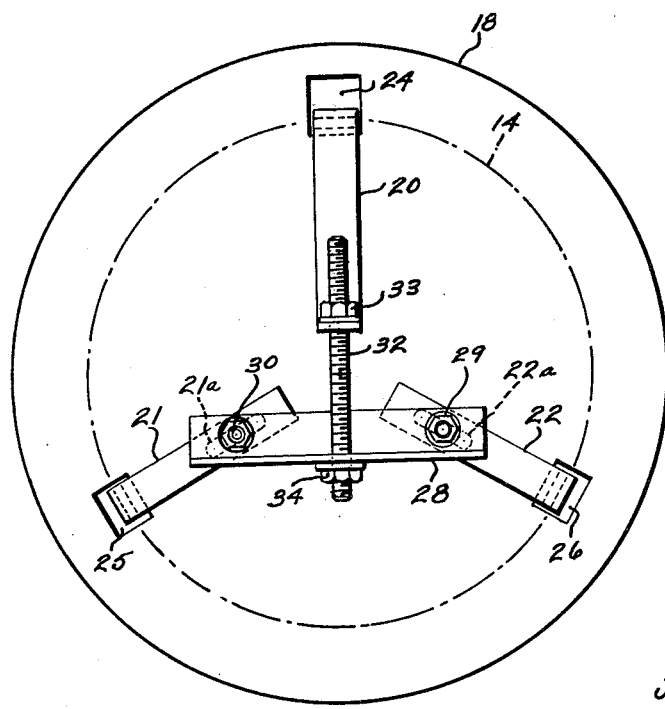
FIGURE 2 represents, in front elevation as viewed in the direction of lines 2—2, the disk edger and the radially adjustable wheel clamping means for holding it on a wheel.

The edger grass trimmer attachment is shown in greater detail in FIGURE 2, in an exterior elevation in the direction of lines 2—2 of FIGURE 1. It comprises a compact and singular unit of few parts that are readily adjustable and replaceable without any special knowledge in the event of damage. Also, the unit is adapted to be mounted or removed by simple tools after use by almost any operator. As shown, onto the grass cutting disk 18, there are secured spaced wheel clamping arms 20, 21, 22 which are generally in the form of an angular letter S. Two of them (21, 22) are secured to the disk 18 by bolts 29, 30 positioned in and extending through elongated slots 21a, 22a, providing for radial adjustment of their clamping length. Clamping arm 20 is held in adjustable position by means of adjusting bolt 32 which extends through the arm's 20 right angular and lower outward projection. The bolt 32, further, extends through a right angular projection of angle 28 that also is secured to the face of the edger trimmer disk 18 by the hereinbefore mentioned bolt and nut arrangement 29 and 30 securing clamping arms 21, 22. The bolt 32 is adjustably positioned by means of the threaded nuts 33, 34, being in opposition, and bearing against the right angular projections of the clamping arm 20 and of the right angular projection of the angle 28. The clamping arms 21, 22 once positioned can be left in permanent adjustment since only the third clamping arm 20 on the power wheel 14 need be loosened or tightened.

Figure 3:
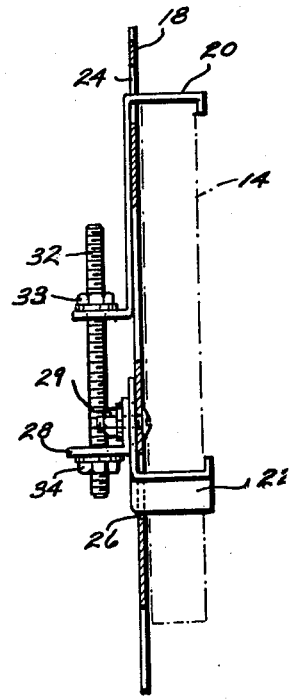
FIGURE 3 is a side elevation, in partial section, of the disk edger of FIGURE 2 showing the inner extension of the wheel clamps and their adjustment to accommodate different size wheels.

This unitized combination is further shown in FIGURE 3. The wheel 14 is shown therein in dotted line and the clamps of arms 20 and 22 are positioned in secured relation about the wheel 14, the clamping arms will remain locked unless released by the adjustment of nut 33 about bolt 32 since it is capable of drawing the arms toward each other. The terminal inwardly extending angular clamping projections of arms 20, 21 and 22 are desirably hooked over at their ends so as to partially encompass the opposite side of the wheel 14, and not to slip off. The end clamping extensions of the arms 20, 21, 22 can be tightly drawn about the wheel periphery, generally a rubber tire, to be partly embedded therein so as not to leave an undesirable protuberance on the wheel surface to effect a thumping or irregular rolling movement. The grass depth itself will absorb peripheral irregularity so as not to cause any uneven cutting or edging of grass.

The disk plate 18 can be readily removed off the driving wheel 14 when it is no longer needed for trimming. To remove the unit all that needs be done is to merely loosen the nut 33 which will release the clamp arm 20 to an extent so as to clear the downward clamp projection of the arm. The lower nut need not be touched unless the unit is to be used subsequently on a different sized wheel. If it is to be used again on the same wheel, it is readily placed thereon by slipping the clamp arm 20 over the wheel and drawing down on the nut 33.

As mentioned hereinbefore a single disk edging unit can be used for various sized wheels within a certain range of diameters. The adjustment feature adapts the trimmer to fit various wheels since the bolt 32 and the slots 24, 25 and 26 in the disk face provide considerable latitude to meet diameter changes. Also, the cutting disk 18, as a lawn edge trimmer, can be made of any machineable rigid material whether metallic or nonmetallic. Preference is in the direction of metallic disks since the thickness to obtain necessary rigidity and maintenance of a cutting edge are had. A nonmetallic material can be used. Such a disk can be a resin impregnated fiber laminate disk, or one of fiber glass or of recent synthetic polymers such as of nylon (a polyamide) or polyester. Rigidity and a sustained cutting edge are necessary requirements so nonmetallic disks would necessarily be thicker in cross-section, however, a number of nonmetallics such as mentioned are adaptable and usable.

The rigid connection of the disk to a power wheel of a mower enables the unit to serve as cutter or saw under certain circumstances. With the disk having a serrated or saw-tooth periphery, the mower can be raised and placed on a platform freeing the disk equipped wheel to serve as a saw, or where needed, led over material to be cut. A fine saw-tooth periphery is advantageous for grass trimming especially the heavier grasses. Long use will obviously wear the saw edge down to a continuous one, but it can be resharpened where it is found to be of advantage.

As described and shown, the preferred attachment or disk mounting is against the power wheel and clamped around it. This method of mounting provides a firm and solid connection. Of course, the mounting can be varied so long as the disk is secured to the power wheel. The clamp extensions can be longer to keep the disk away from its wheel several inches where necessary. This clamp extension would provide for additional wheel clearance from a lawn edge to avoid the possibility of the wheel falling into the edge depressions. Also, the disk can be secured to the wheel by means of a bolt and washer assembly turned into a shaft end. This latter method would not be feasible unless the shaft end were accessible and threaded.

What is claimed is:

1. A lawn edge trimmer adapted for mounting on an outside power driven wheel of a power mower comprising in combination, a metallic disk of greater diameter than the wheel to which it is attached, said disk having a plurality of circumferentially spaced slots below its periphery, a radially adjustable wheel clamping means on said disk having radially extending arms with right angle ends positioned through said circumferentially spaced slots over the wheel periphery, and adjusting means for radially adjusting said arms relative to said disk and drawing the ends thereof tightly about said wheel periphery.

2. A lawn edge trimmer adapted for mounting on an outside wheel of a power mower comprising in combination, an outer power driven wheel of a power mower, a metallic disk having circumferentially spaced openings adjacent its edge and being of a larger diameter than the said outer driven wheel and being secured thereto, an adjustable wheel clamping means mounted on said disk for securing it to the said power driving wheel, said adjustable clamping means comprising at least three circularly spaced, radially extending arms disposed against the face of said disk and having at their outer ends inwardly extending hooked portions extending through said circumferentially spaced openings, said hooked portions being of a length adapted to be positioned about the periphery of the driven wheel, and adjusting means radially adjusting said arms for drawing them securely against said driven wheel.

References Cited by the Examiner
UNITED STATES PATENTS

| | | | |
|---|---|---|---|
| 1,010,260 | 11/11 | Hill | 172—14 X |
| 1,732,308 | 10/29 | Livingston | 56—251 |
| 2,508,841 | 5/50 | Schreibman | 248—30 |
| 2,680,947 | 6/54 | Weimer | 56—26 |
| 2,744,558 | 5/56 | Ciavola | 152—228 |
| 3,133,597 | 5/64 | Smith | 172—14 |

ANTONIO F. GUIDA, *Acting Primary Examiner.*
RUSSELL R. KINSEY, T. GRAHAM CRAVER,
*Examiners.*